(12) United States Patent
Cahill et al.

(10) Patent No.: US 11,417,508 B2
(45) Date of Patent: Aug. 16, 2022

(54) POROUS MEMBRANE ENABLED MASS SPECTROMETRY CHARACTERIZATION OF MICROFLUIDIC DEVICES

(71) Applicant: UT-Battelle, LLC, Oak Ridge, TN (US)

(72) Inventors: John F. Cahill, Knoxville, TN (US); Vilmos Kertesz, Oak Ridge, TN (US); Scott T. Retterer, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 206 days.

(21) Appl. No.: 16/744,980

(22) Filed: Jan. 16, 2020

(65) Prior Publication Data

US 2021/0225628 A1 Jul. 22, 2021

(51) Int. Cl.
*G01N 1/10* (2006.01)
*H01J 49/04* (2006.01)
*G01N 30/72* (2006.01)
*G01N 35/10* (2006.01)
*G01N 1/02* (2006.01)

(52) U.S. Cl.
CPC ............ *H01J 49/0454* (2013.01); *G01N 1/10* (2013.01); *G01N 30/7233* (2013.01); *G01N 35/1095* (2013.01); *G01N 2001/028* (2013.01)

(58) Field of Classification Search
CPC .... H01J 49/0454; H01J 49/0431; G01N 1/10; G01N 30/7233; G01N 35/1095; G01N 2001/028
USPC ............... 75/61.55, 61.59, 864.33, 864.81; 250/288, 425
See application file for complete search history.

(56) References Cited

U.S. PATENT DOCUMENTS

| 4,920,060 | A | * | 4/1990 | Parrent, Jr. ............... G01N 1/38 422/70 |
| 5,149,658 | A | * | 9/1992 | Cassaday ........... B01D 17/0214 436/53 |
| 6,736,883 | B2 | * | 5/2004 | Sjostrom ............ G01N 33/0045 96/112 |
| 9,630,178 | B2 | | 4/2017 | Retterer et al. |
| 9,779,926 | B2 | | 10/2017 | Van Berkel et al. |
| 9,869,661 | B2 | | 1/2018 | Van Berkel |
| 2009/0173171 | A1 | * | 7/2009 | Utani ..................... G01N 30/32 73/864.81 |
| 2018/0356317 | A1 | | 12/2018 | Kertesz et al. |

* cited by examiner

*Primary Examiner* — Robert R Raevis
(74) *Attorney, Agent, or Firm* — Fox Rothschild LLP

(57) ABSTRACT

A system for sampling a liquid includes a sample fluid conduit including a membrane having pores. The membrane prevents the passage of the sample liquid through the pores at a first pressure of the sample liquid in the sample fluid conduit. A surface sampling capture probe has a distal end. The capture probe includes a solvent supply conduit and a solvent exhaust conduit. A solvent composition flowing at the distal end of the capture probe establishes a liquid junction with the membrane and establishes a second pressure within the liquid junction at the membrane. The second pressure is lower than the first pressure. Sample liquid will be drawn through the pores of the membrane by the second pressure at the liquid junction. A method for sampling a liquid and for performing chemical analysis on a liquid are also disclosed.

27 Claims, 13 Drawing Sheets

POROUS MEMBRANE ENABLED MASS SPECTROMETRY CHARACTERIZATION OF MICROFLUIDIC DEVICES

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to mass spectrometry, and more particularly to the mass spectrometry analysis of analytes in liquid samples.

BACKGROUND OF THE INVENTION

The chemical analysis of living systems has become more feasible with the development of sensitive analytical techniques. Mass spectrometric characterization requires destruction of the system being analyzed, negating the ability to measure systems in situ especially for small systems in fluid media. Most applications of in situ mass spectrometry have been directed toward the chemical analysis of produce, leaves, skin, or otherwise stable, non-dynamic samples. Currently there is no capability to enable mass spectrometric characterization of dynamic, living systems without destroying or negatively altering the entire system. Methods to provide mass spectrometric in situ chemical information living systems are of interest to the biochemical, pharmaceutical, and medical research communities.

SUMMARY OF THE INVENTION

A method for sampling a sample liquid includes the step of providing the sample liquid through a sample fluid conduit. The sample fluid conduit includes a membrane including pores. The membrane prevents the passage of the sample liquid through the pores at a first pressure of the sample liquid in the sample fluid conduit.

A surface sampling capture probe with a distal end is provided. The capture probe includes a solvent supply conduit with an open end and a solvent exhaust conduit with an open end. A solvent composition is flowed at the distal end of the capture probe from the open end of the solvent supply conduit to the open end of the exhaust conduit and establishes a liquid junction with the membrane and establishes a second pressure within the liquid junction at the membrane. The second pressure can be lower than the first pressure. Sample liquid is drawn through the pores of the membrane by the second pressure at the liquid junction wherein the extracted sample liquid is combined with the flowing solvent composition of the capture probe and flows into the open end of the exhaust conduit of the capture probe. The method can further include the step of conducting mass spectrometry on the extracted sample liquid. The method can further include the step of collecting the solvent composition and sample liquid from the exhaust conduit of the capture probe in a storage container.

The surface tension of the solvent composition when in a liquid junction with the membrane having a junction fluid diameter can prevent expansion of the junction fluid diameter beyond two times the diameter of the distal end of the capture probe. The surface tension of the solvent composition does not permit the solvent to flow through the pores of the membrane at the second pressure.

The solvent composition can include a component that is a solvent for an analyte of interest in the sample liquid. The solvent composition can include a solvent liquid and a high surface tension component having a surface tension higher than that of the solvent liquid. The solvent composition can include an acid or base component for ionizing an analyte of interest in the sample fluid. The solvent composition can include a reactant for an analyte of interest in the sample liquid to produce an analyte reaction product. The analyte reaction product provides increased sensitivity for mass spectrometry relative to the unreacted analyte of interest.

A system for sampling a liquid can include a sample fluid conduit. The sample fluid conduit can include a membrane comprising pores. The membrane prevents the passage of the sample liquid through the pores at a first pressure of the sample liquid in the sample fluid conduit. A surface sampling probe with a distal end can be provided. The capture probe can include a solvent supply conduit with an open end and a solvent exhaust conduit with an open end. A solvent composition flowing at the distal end of the capture probe from the open end of the solvent supply conduit to the open end of the exhaust conduit can establish a liquid junction with the membrane and can establish a second pressure within the liquid junction at the membrane. The second pressure can be lower than the first pressure. Sample liquid will be drawn through the pores of the membrane by the second pressure at the liquid junction and the extracted sample liquid will combine with the flowing solvent composition of the capture probe and flow into the open end of the exhaust conduit of the capture probe. The system can further include a chemical analysis device. The chemical analysis device can include a mass spectrometer.

The capture probe can include an outer probe housing having a coaxial inner solvent exhaust conduit, and an annular solvent supply conduit between the solvent exhaust conduit and the outer prove housing. The system can further include a storage container for collecting the solvent composition and sample liquid from the exhaust conduit of the capture probe. The sample fluid conduit can be provided in a sample fluid conduit housing.

A method of performing chemical analysis on a sample liquid can include the step of providing the sample liquid through a sample fluid conduit. The sample fluid conduit can include a membrane comprising pores. The membrane prevents the passage of the sample liquid through the pores at a first pressure of the sample liquid in the sample fluid conduit. A surface sampling capture probe with a distal end is provided. The capture probe can include a solvent supply conduit with an open end and a solvent exhaust conduit with an open end. The method includes flowing a solvent composition at the distal end of the capture probe from the open end of the solvent supply conduit to the open end of the exhaust conduit and establishing a liquid junction with the membrane and establishing a second pressure within the liquid junction at the membrane. The second pressure can be lower than the first pressure. Sample liquid is drawn through the pores of the membrane by the second pressure at the liquid junction, and the extracted sample liquid is combined with the flowing solvent composition of the capture probe and flows into the open end of the exhaust conduit of the capture probe. The extracted sample liquid is directed to a chemical analysis device and performing chemical analysis on the extracted sample liquid. The chemical analysis device can be a mass spectrometer and the chemical analysis can be mass spectrometry.

A method for sampling a sample liquid can include the step of providing the sample liquid in a sample fluid conduit. The sample fluid conduit can include a membrane comprising pores. The membrane prevents the passage of the sample liquid through the pores at a first pressure of the sample liquid in the sample fluid conduit. Solvent composition is flowed from the open end of a solvent supply conduit to contact the membrane. A second pressure is established within the solvent in contact with the membrane through a solvent exhaust conduit. The second pressure is lower than the first pressure. Sample liquid is drawn through the pores of the membrane by the pressure differential of the first pressure and the second pressure, wherein the extracted sample liquid is combined with the flowing solvent composition and flows into the open end of a solvent exhaust conduit.

The solvent supply conduit and the solvent exhaust conduit can be the same conduit, for example the supply and exhaust of solvent can be provided by varying the pressure within a single tube having an open end. A pipette is an example. The solvent can form a liquid microjunction between the tube and the membrane. The solvent can be deposited on the membrane by the solvent supply conduit, then the supply of solvent can be stopped and the solvent on the membrane allowed to stand for a period of time, and then the second pressure can be applied to the solvent in contact with the membrane by the solvent exhaust conduit.

BRIEF DESCRIPTION OF THE DRAWINGS

There are shown in the drawings embodiments that are presently preferred it being understood that the invention is not limited to the arrangements and instrumentalities shown, wherein:

FIG. 3 in FIG. 1.

DETAILED DESCRIPTION OF THE INVENTION

Figure 1:
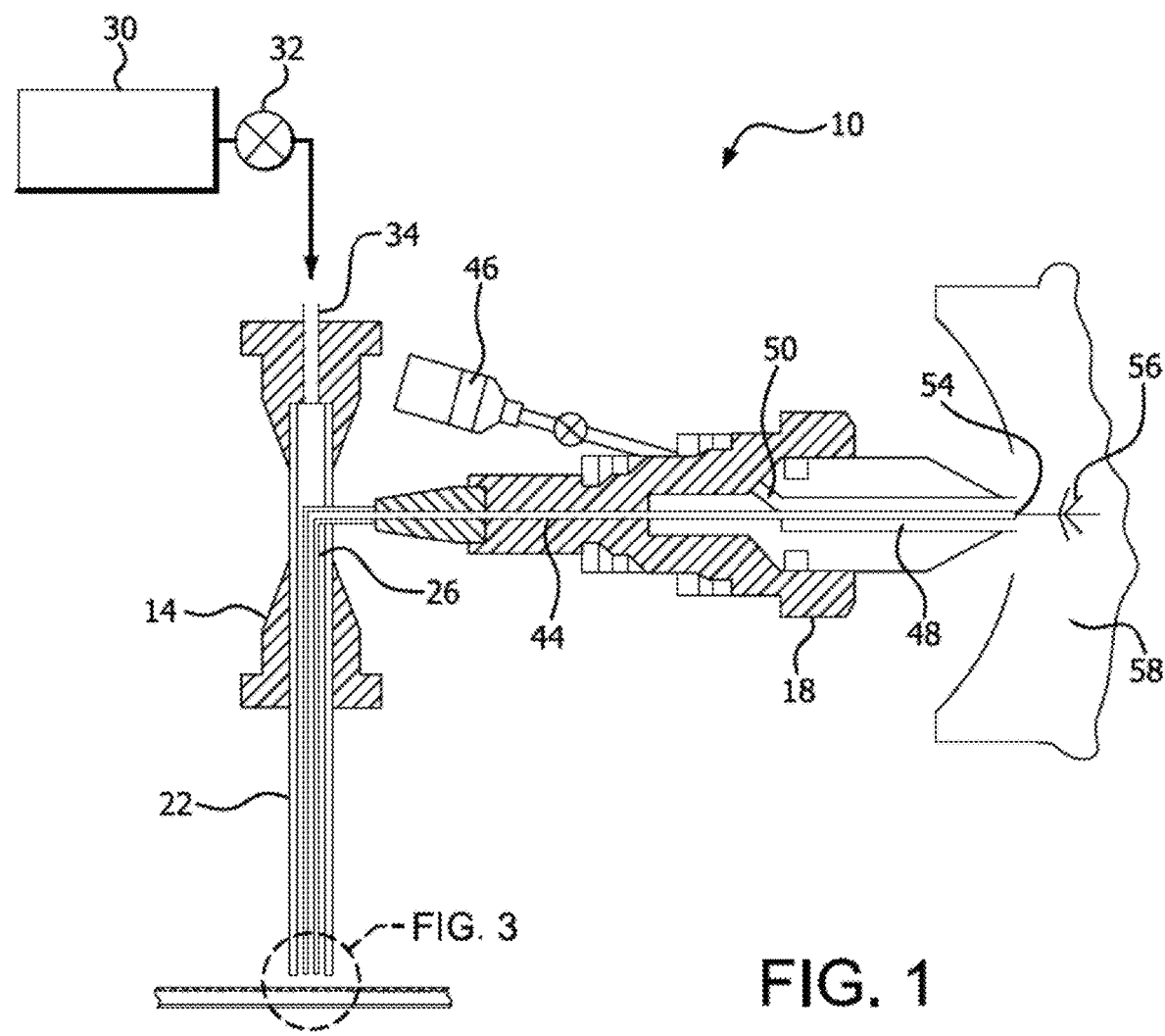
FIG. 1 is a schematic cross-sectional diagram of a system for performing mass spectrometry analysis on a flowing liquid sample source.
Figure 2:
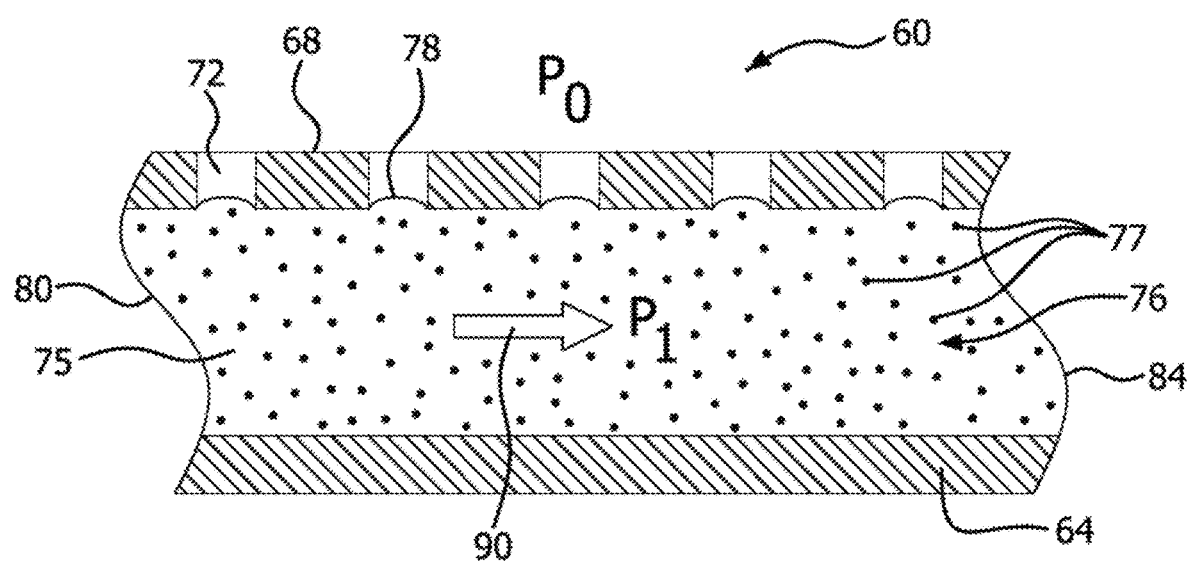
FIG. 2 is a schematic cross sectional diagram of a microfluidic device for performing chemical analysis of a flowing liquid sample source.

A method for sampling a sample liquid includes the step of providing the sample liquid through a sample fluid conduit. The sample fluid conduit comprises a membrane comprising pores. The membrane prevents the passage of the sample liquid through the pores at a first pressure of the sample liquid in the sample fluid conduit. A surface sampling capture probe is provided having a distal end. The capture probe includes a solvent supply conduit with an open end and a solvent exhaust conduit with an open end. Solvent composition flows at the distal end of the capture probe from the open end of the solvent supply conduit to the open end of the exhaust conduit, and establishes a liquid junction with the membrane. A second pressure is established within the liquid junction at the membrane. The second pressure is lower than the first pressure, thereby drawing sample liquid through the pores of the membrane by the second pressure at the liquid junction. The extracted sample liquid is combined with the flowing solvent composition of the capture probe and flows into the open end of the exhaust conduit of the capture probe.

A system for sampling a liquid includes a sample fluid conduit including a membrane having pores. The membrane barrier prevents the passage of the sample liquid through the pores at a first pressure of the sample liquid in the sample fluid conduit. A surface sampling capture probe has a distal end. The capture probe includes a solvent supply conduit with an open end and a solvent exhaust conduit with an open end. A solvent composition flowing at the distal end of the capture probe from the open end of the solvent supply conduit to the open end of the exhaust conduit establishes a liquid junction with the membrane and establishes a second pressure within the liquid junction at the membrane. The second pressure is lower than the first pressure. Sample liquid will be drawn through the pores of the membrane by the second pressure at the liquid junction and the extracted sample liquid combines with the flowing solvent composition of the capture probe and flow into the open end of the exhaust conduit of the capture probe. A method for sampling a liquid and for performing chemical analysis on a liquid are also disclosed.

The method can further include the step of conducting mass spectrometry on the extracted sample liquid. The system can also be used to withdraw sample from a flowing sample liquid for other chemical analysis methods and devices. The method can include the step of collecting the solvent composition and sample liquid from the exhaust conduit of the capture probe in a storage container for later analysis by any suitable chemical analysis method or device. The system can include a storage container for collecting the solvent composition and sample liquid from the exhaust conduit of the capture probe. The storage container can have differing designs and sizes.

The method can utilize a number of different solvent compositions. The solvent composition when in a liquid junction with the membrane has a junction fluid diameter, and the surface tension of the solvent composition and selection of the membrane material should prevent expansion of the junction fluid diameter beyond two times the diameter of the distal end of the capture probe. The surface tension of the solvent composition should also not permit the solvent composition to flow through the pores of the membrane at the second pressure. Suitable solvents include methanol or acetonitrile mixed with water, formic acid, ammonium acetate, ammonium hydroxide, acetic acid, ammonium formate, or isopropyl alcohol.

The solvent composition can include a component that is a solvent for an analyte of interest in the sample liquid, for example, methanol or acetonitrile. The solvent composition can include a solvent liquid and a high surface tension component having a surface tension higher than that of the solvent liquid for example, water or isopropyl alcohol. The solvent composition can include an acid or base component for ionizing an analyte of interest in the sample fluid for example, formic acid, ammonium acetate, ammonium hydroxide, acetic acid or ammonium formate. The solvent composition can include a reactant for an analyte of interest in the sample liquid to produce an analyte reaction product which analyte reaction product provides increased sensitivity for mass spectrometry relative to the unreacted analyte of interest for example, the molecular tagging of cysteines with benzoquinones.

The system can further include a chemical analysis device. The chemical analysis device can include a mass spectrometer. Other chemical analysis methods and devices that are suitable for use with the invention include spectroscopic detection (fluorescence, Raman, etc.), conductivity measurement, or pH detection.

The capture probe can have different designs. In one aspect, the capture probe comprises an outer probe housing having a coaxial inner solvent exhaust conduit, and an annular solvent supply conduit between the solvent exhaust conduit and the outer prove housing.

The surface tension of the solvent composition does not permit the solvent composition to flow through the pores of the membrane at the second pressure. It is possible to operate the capture probe at a third pressure, less than the pressure of the sample fluid but not low enough to draw significant amounts of the sample fluid through the pores.

The construction of the membrane can vary. The membrane can be made from polycarbonate (PCT), polyester (PET), polytetrafluoroethylene (PETE), polydimethylsiloxane (PDMS), polyether ether ketone (PEEK), nylon, silver or glass Fiber. The membrane pores can have differing dimensions, for example from 0.01 to 10 µm. The thickness of the membrane can vary, for example from 0.1 to 1000 µm. The membrane can have track-etched or tortuous pores and can be coated with polymer films and can have 1 to $10^8$ pores/cm².

The sample fluid conduit can be provided in a sample fluid conduit housing. The housing can have differing designs and sizes. The sample fluid conduit can be provided in a microfluidic device. The fluid does not have to flow constantly, for example, fluid can be flowed into the cell, halted and then sampled.

There is shown in FIGS. 1-4 a system 10 for porous membrane enabled mass spectrometry characterization of microfluidic devices. The system 10 includes a capture probe 14 and a suction nebulizer 18. The capture probe 14 can include an outer tube 22 with distal open end 23 and an inner tube 26 with distal open end 27 arranged in substantially coaxial arrangement. Other capture probe designs are possible.

The capture probe 14 receives solvent from a suitable solvent source 30. Solvent received from source 30 travels through the capture probe 14 in annular solvent supply flow channel 38 formed between the outer tube 22 and the inner tube 26. The inner tube 26 defines an exhaust flow channel 42 and has a distal end 27. The suction nebulizer 18 applies suction as by a suitable pump or in the embodiment shown a supply of nebulizer gas 46 which is introduced into nebulizer passageway 48 through inlet 50 and flows past open end 54 of exhaust passageway 44. The flow of nebulizer gas contacts solvent at the open end 54 to create a nebulizer spray 56 of the sample solvent into MS inlet 58. The flow of nebulizer gas creates a low pressure at the open end 54 and thereby within the exhaust conduit 44 and within the exhaust flow channel 42 of the capture probe 14 within the inner tube 26. Control of the suction nebulizer 18 can be affected to control the flow of solvent through the exhaust conduit 26. Control of the solvent source can be affected through a suitable valve 32 through an inlet opening 34. The supply of solvent and the exhaust of solvent can be controlled by a suitable processor. The balance of solvent flows in the solvent supply flow channel 38 and the solvent exhaust flow channel 42 creates a liquid microjunction 106.

A microfluidic device 60 includes a wall 64 and a porous membrane 68 defining a flow channel 76. The porous membrane 68 includes pores 72. A sample solution 75 containing analyte 77 is provided in the flow channel 76 at pressure $P_1$. The wimple solution can enter the flow channel 76 at any suitable fluid inlet 80 and exit at a suitable fluid exit 84. The sample fluid can flow in the flow channel 76 as imitated by arrow 90, The size of the pores 72 and the surface tension of the sample fluid is such that the sample fluid may enter the pores 72 as shown by meniscus 78 but does not pass through the pores 72. The sample solution 76 is contained by the microfluidic device 60 at pressure $P_1$ when the pressure outside the microfluidic device 60 is that pressure $P_0$. $P_0$ can be any outside pressure, such as atmospheric pressure.

Figure 3:
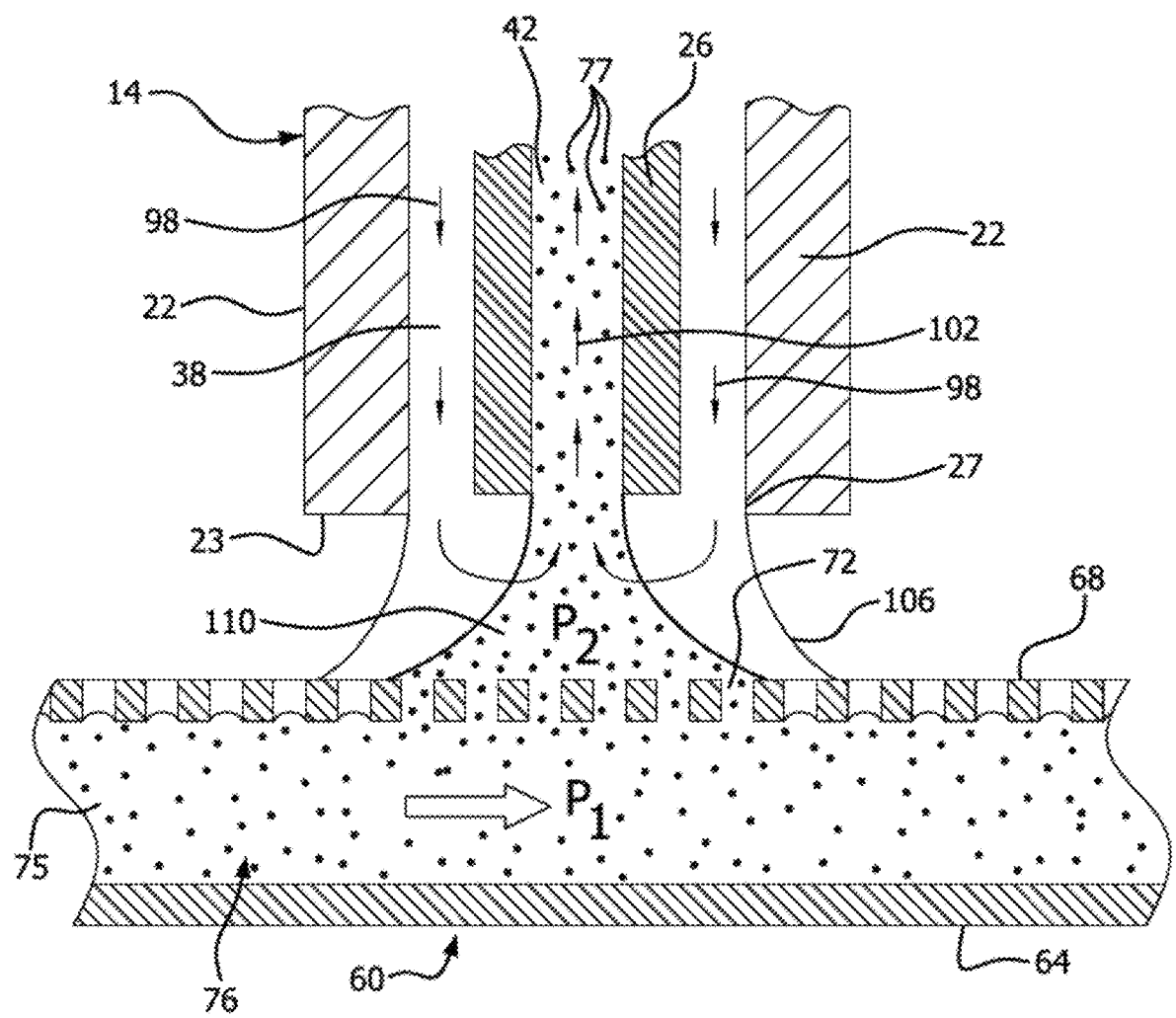
FIG. 3 is an enlarged schematic cross sectional diagram of area

In operation, as shown in FIG. 3, the capture probe 14 is brought into proximity to the microfluidic device 60 and solvent is caused to flow through the annular solvent supply flow channel 38 solution as shown by arrows 98. The section nebulizer 18 is operated to withdraw solvent solution through the exhaust flow channel 42 as indicated by arrow 102. This will cause the formation of a liquid microjunction 106 between distal end 23 of the capture probe 14 and the porous membrane 68. The balance between solvent supply and withdrawal can be controlled to create a pressure $P_2$ within the liquid microjunction 106. $P_2$ is less than $P_0$ and less than $P_1$. At $P_2$ the pressure differential between $P_2$ and $P_1$ is sufficient to overcome the surface tension of the solvent solution 75 within the pores 72 such that some sample fluid 110 will be drawn through the pores 72 and into the exhaust flow channel 42.

Figure 4:
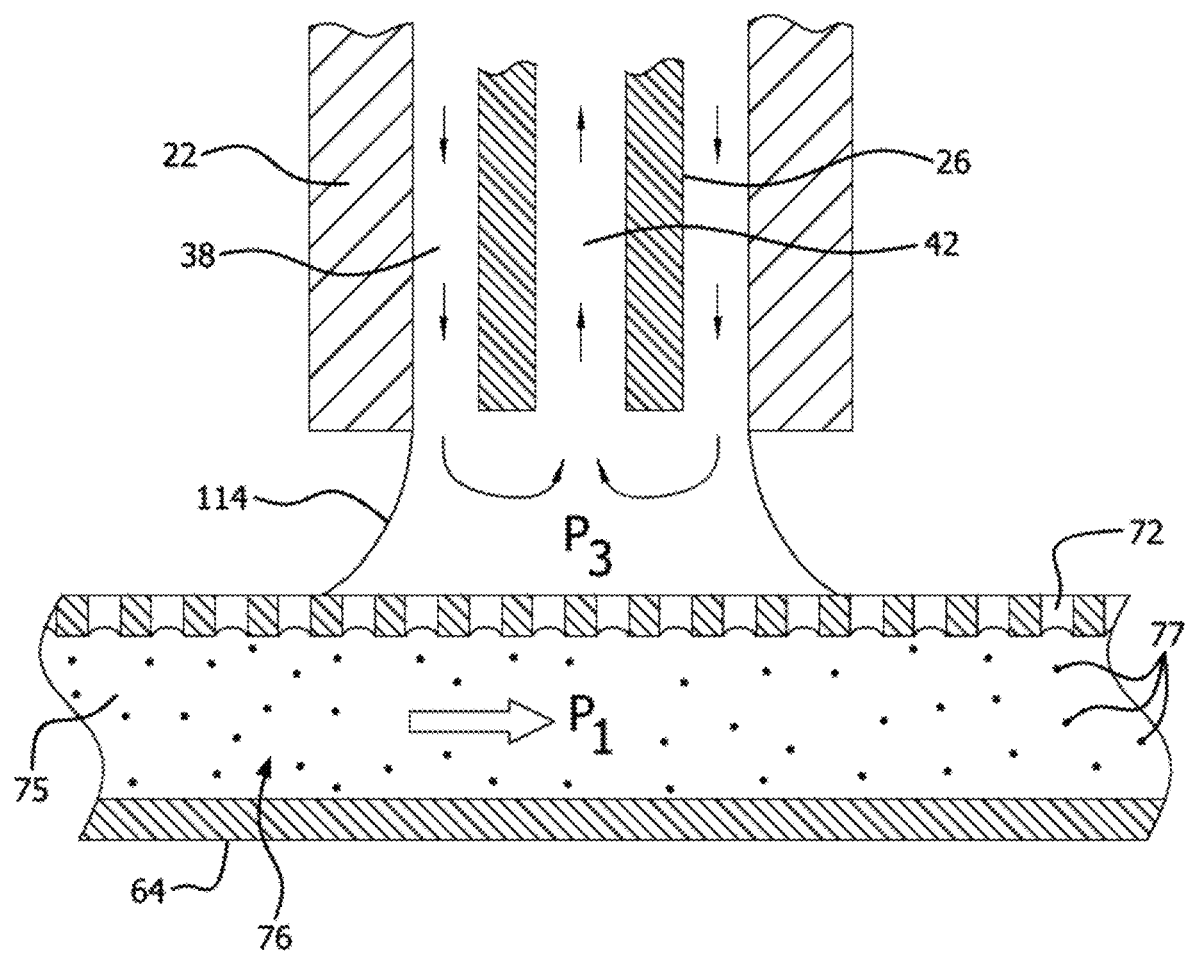
FIG. 4 is a an enlarged schematic diagram of area FIG. 3 in FIG. 1, and in an alternative mode of operation.

The pressure within the liquid microjunction can be controlled by control of the solvent supply rate and the solvent exhaust rate. FIG. 4 illustrates the condition where the supply and exhaust solvent flows are controlled to provide a liquid microjunction 114 with a pressure $P_3$ within the microjunction 114. The pressure $P_3$ is less that $P_1$, but greater than $P_2$. The pressure differential between $P_1$ and $P_3$ is insufficient to draw sample solution 75 through the pores 72, and is insufficient to drive solvent from the capture probe 14 into the flow channel 76. $P_3$ should not be so great that solvent is forced through the pores 72 and into the flow channel 76 microfluidic device 60 as this could contaminate or dilute the sample solution 75 in the flow channel 76. The system can be controlled on demand to change the solvent flow rates to a pressure, for example $P_2$, that will withdraw sample fluid from the membrane 76.

The invention provides for the on-line/in situ chemical analysis of microfluidic flow cells through the combination of a microfluidic device with a porous polymer membrane wall and sampling with liquid microjunction-surface sampling capture probe mass spectrometry (MS). This enables online chemical characterization of constituents within the device by MS. This combination provides a system and method to continuously sample and chemically characterize small volumes of liquid directly from a microfluidic device at any point along a 2D surface in near real-time and without greatly negatively altering the state of the microfluidic system. The invention can also be used for the chemical analysis of living systems in microfluidic devices continuously without destruction or modification to the biological system.

The microfluidic device is fabricated with a porous membrane surface on one side of the device, or on several sides. The capture probe MS sampling device can form a liquid microjunction between the membrane surface which extracts nL-to-uL volumes from the microfluidic device, through the membrane and into the capture probe. The liquid extracts can then be chemically characterized by mass spectrometry, or another chemical analysis technology. The porous membrane of the microfluidic device also allows selective liquid extraction at any point along the membrane surface. The use of a porous membrane microfluidic device in a configuration that allows for chemical analysis at any point on the surface of the device, without destroying the function and lifetime of the device.

Chemical analysis of dynamic fluid systems often precludes the use of mass spectrometry as it is destructive. The invention provides a way to measure the chemistry within a microfluidic flow cell at any point along a 2D surface using mass spectrometry. Uses include the on-line measure of chemical dynamics within microfluidic devices with mass spectrometric detection. Chemical mapping of over the entire surface of a microfluidic device is possible to show chemical differences occurring in different regions of the device. The invention permits repeated chemical measure at single or multiple points anywhere on the microfluidic device providing temporally resolved chemical information. Mass spectrometric chemical detection within microfluidic devices can be performed without dismantling the device or negatively influencing its function.

The capture probe that was used also included a vacuum suction capillary. The capture probe was made using three capillaries co-axially aligned. The outer capillary was stainless steel (~1.067 mm-i.d.×~0.686 mm-o.d.×3.5 cm long) connected to a PEEK T-manifold (IDEX Health & Science LLC, Oak Harbor, Wash., USA). One of the ports connected to the sampling end of the capture probe and the other connected to house vacuum to provide suction through this tube. This served to prevent any pooling of solvent on the sample surface when solvent delivery exceeded aspiration at the initialization of the capture probe device, but it did not influence normal capture probe operation. The middle capillary was stainless steel (~0.406 mm-i.d.×0.508 mm-o.d.× 7.0 cm long) connected to the mass spectrometer ion source electrical ground. A stainless-steel capillary (0.178 μm-i.d.× 0.330 μm-o.d.×~30 cm long) was used as the inner tube and acted as the nebulizing capillary of an atmospheric pressure chemical ionization (APCI) ion source of a Q-Exactive HF orbitrap mass spectrometer (ThermoFisher Scientific, Waltham, Mass., USA). The middle and inner capillaries were secured to another PEEK T-manifold (IDEX Health & Science LLC, Oak Harbor, Wash., USA). Solvent was delivered by a high-performance liquid chromatography (HPLC) pump (model 1100, Agilent Technologies, Santa Clara, Calif., USA) into the annulus region of the capture probe. Nebulizing gas (nitrogen) in the ion source was used to control the solvent aspiration rate through the probe. This was set to slightly exceed the solvent delivery rate to the capture probe from the HPLC.

A stable liquid vortex was maintained at the surface of the probe. Upon contact of the capture probe with a surface, a liquid microjunction was formed between the surface and the capture probe. The capture probe was connected to a XYZ stage (MS-2000, Applied Scientific Instrumentation, Eugene, Oreg., USA) which was used to control the movement of the probe. Control of the stage was done using custom control software developed in house using Delphi 3 computer language (Borland Software Corp., Scotts Valley, Calif.). Mass spectra were acquired continuously using a sheath gas flow=80, auxiliary gas flow=40, capillary temperature=250° C., source temperature=400° C., and APCI current=5 μA. Specific scan settings were optimized for each experiment. Caffeine and $d_3$-caffeine were monitored simultaneously using all ion fragmentation (AIF) scans of m/z 190-200 with a scan window of m/z 100-200 (normalized collision energy (NCE)=50 eV, resolution=45,000, automatic gain control (AGC)=1e6, injection time=100 ms). A common fragment ion to caffeine and $d_3$-caffeine (m/z 138) was used to corroborate experiments.

The invention permits the efficient extraction of small amounts of fluid from a microfluidic flow cell with a porous membrane conducted in situ without significantly affecting its operation. To validate the ability to extract fluid through the porous membrane wall, a single-channel (500 μm wide and 160 μm deep) microfluidic flow cell was designed. The channel was sealed using a 0.4 μm pore size track etched, hydrophobic PETE membrane. The flow cell was fed with a constant 10 μL/min flow of 2.55 μM caffeine in water. Based on the pore size of the membrane and the surface tension of water, the 2.55 μM caffeine solution flowed through the channel rather than out of the porous membrane.

The solvent of the capture probe was optimized to achieve efficient analyte extraction without negatively impacting the flow cell. Typically, solvents such as acetonitrile and methanol are used in capture probe operation, but these solvents have sufficiently low surface tension that they can wet the entire membrane surface upon contact with the capture probe. A solvent composition of 75/25/0.1 ACN/$H_2O$/FA (v/v/v) was found to enable liquid microjunction formation without wetting of the PETE membrane beyond the area of the capture probe. To demonstrate the continuous fluid extraction through the porous membrane, the capture probe was positioned ~20-40 μm above the membrane surface in order to form a liquid microjunction between the membrane surface and the capture probe. Liquid extraction through the PETE membrane was monitored by mass spectrometric detection of caffeine that was present in the solvent flowing through the flow cell. To quantitate the amount of caffeine detected, $d_3$-caffeine was added to the capture probe extraction solvent to act as an internal standard. The capture probe extraction solvent was made up by mixing 75/25/0.1 ACN/$H_2O$/FA at 150 µL/min with 44 µM $d_3$-caffeine in water (final concentration of 0.29 µM) at 1 µL/min.

Figure 5:
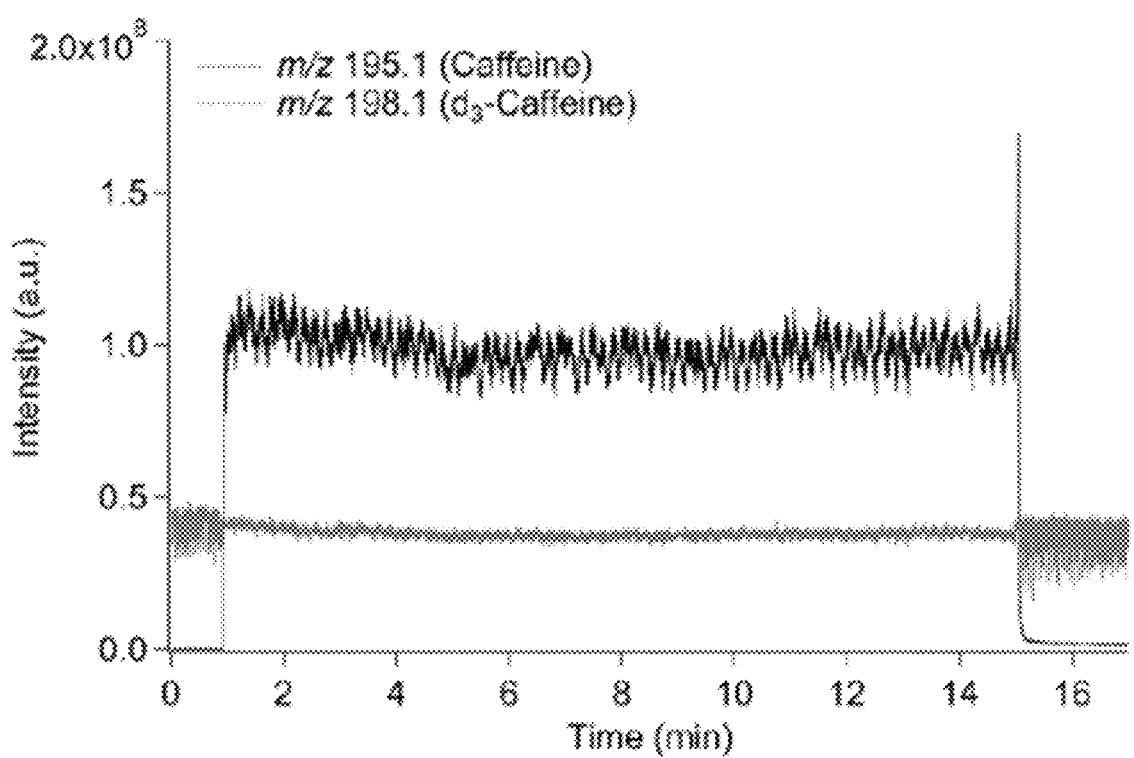
FIG. 5 is an extracted ion chronogram of m/z 195.1 (black) and m/z 198.1 (grey) corresponding to caffeine and $d_3$-caffeine, respectively.

FIG. 5 shows extracted ion chronograms of m/z 195.1 (black) and m/z 198.1 (grey) corresponding to caffeine and $d_3$-caffeine, respectively. FIG. 5 shows continuous fluid extraction through the PETE membrane by the capture probe. A liquid microjunction was formed at t=1 min, which immediately resulted in a mass spectrometric signal of caffeine (~6 s elution time). The capture probe remained in this position for 14 min before it was lifted away from the surface, breaking the liquid microjunction. This is reflected by the sharp decrease in caffeine signal at t=15 min. Continuous extraction of caffeine was observed over the 14 min time period where the liquid microjunction was in place. Hence, this data shows continuous extraction of small volumes of liquid from the flow cell through the porous membrane and into the capture probe. $D_3$-caffeine signal (grey line) was approximately constant over the duration indicating no matrix effects were observed and that no loss of capture probe solvent, wicking of solvent into the flow cell, was occurring.

One concern of using capture probe to extract liquid through the porous membrane wall is the transport of capture probe solvent into the flow cell itself. If this occurs, then the act of sampling by a liquid microjunction may negatively alter or dilute the chemistry occurring in the flow cell. Additionally, for biological systems, exposure to relatively harsh extraction solvents may negatively impact the system. To determine if and to what extent capture probe solvent enters the flow cell through the porous membrane, 100% water without any analyte was infused through the flow cell and outflows were collected under varying flow rates (5-15 µL/min) with and without liquid microjunction formation over the PETE membrane. Since 0.29 µM $d_3$-caffeine is present only in the capture probe solvent, any $d_3$-caffeine signal in collected outflows is from transfer of capture probe solvent into the flow cell. $D_3$-caffeine signals were statistically the same (99% confidence) without capture probe sampling and with capture probe sampling using 5, 10 and 15 µL/min water flow rate in the flow cell. This result indicates that capture probe solvent had not entered the flow cell. Based on the limit of detection of the mass spectrometer in this configuration for $d_3$-caffeine (~1 nM), this data shows that <0.4% of capture probe solvent had been introduced into the flow cell. This data is also corroborated by the constant $d_3$-caffeine signals observed in FIG. 5. If capture probe solvent entered the flow cell there would be reduced $d_3$-caffeine signal, which was not observed.

Control of the extent of liquid extraction can be tuned for each application to minimally perturb the system within the device. Liquid extraction through the porous membrane is likely influenced by several factors including porous membrane pore size, liquid flow rate in the flow cell and capture probe sampling parameters, such as extraction solvent, flow rate, capture probe-to-surface distance, and capture probe capillary dimensions. Briefly, the inner capillary retraction length and capture probe-to-surface distance were found to be critical factors that govern surface sampling. Here, inner capillary retraction lengths were fixed at ~500 µm, but the distance of the capture probe from the membrane surface could vary as the capture probe is moved.

Figure 6:
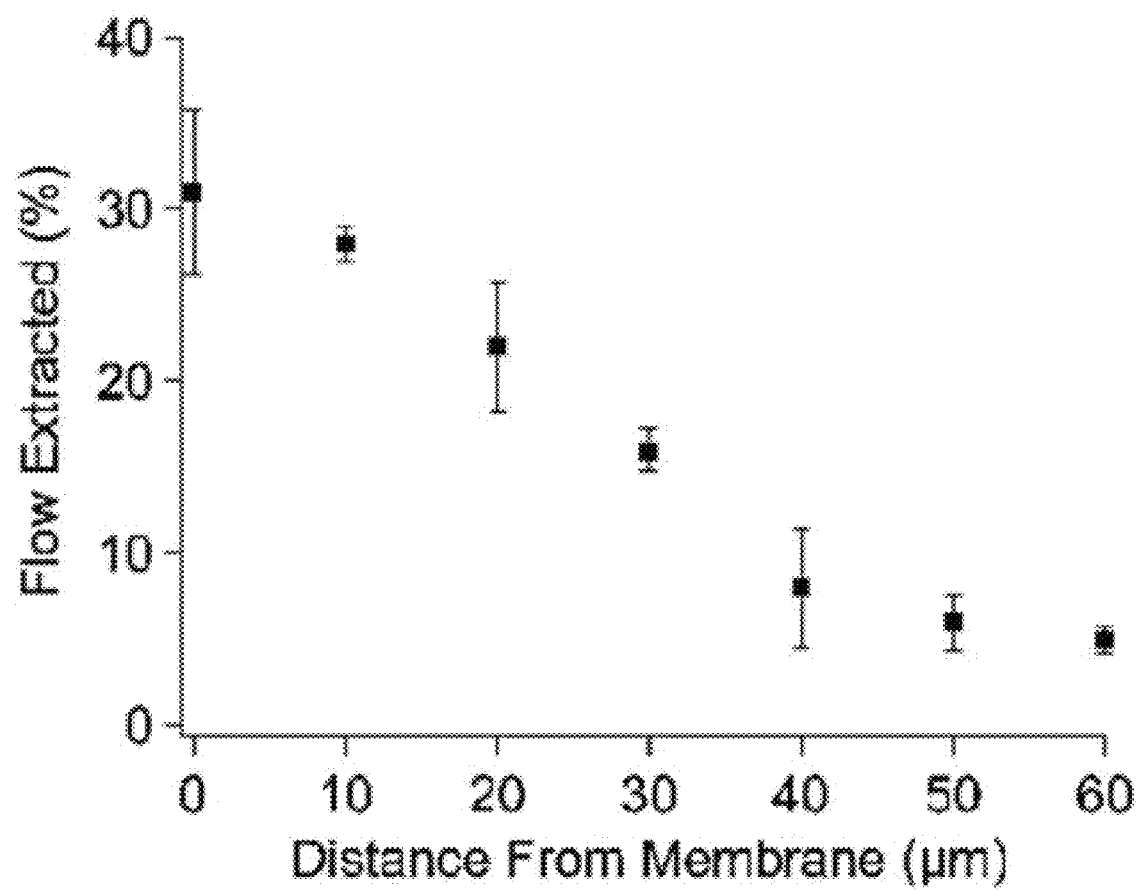
FIG. 6 is a plot of fluid extraction efficiency through the porous membrane (vol %) vs. capture probe-to-surface distance for flow cell flow rate=10 µL/min, capture probe flow rate=151 µL/min, and membrane pore size=0.4 µm.

The effect of capture probe-to-surface distance, the thickness of the liquid microjunction, on fluid extraction efficiency is shown in FIG. 6. Extraction efficiencies were determined by measuring the mass of flow cell outflows and by quantitation of caffeine by capture probe-MS. Fluid extraction efficiency through the porous membrane as a function of capture probe-to-surface distance is shown in FIG. 6 for flow cell flow rate=10 µL/min, capture probe flow rate=151 µL/min, and membrane pore size=0.4 µm. Fluid extraction efficiency is the fraction of flow cell flow rate pulled into the capture probe, and was determined directly by weighing the mass of flow cell outflows with and without capture probe sampling and by quantitation of a known concentration of analyte present in the flow cell by capture probe-MS. In the latter method the amount mass spectrometric signal of caffeine was quantitated and used to determine how much flow cell fluid became integrated into the capture probe. In the flow cell 10 µL/min of 2.55 µM caffeine in water was continuously flowed and a membrane with a pore size of 0.4 µm was used to seal the device. The capture probe used a flow rate of 151 µL/min 0.29 µM $d_3$-caffeine in 75/25/0.1 (v/v/v) ACN/$H_2O$/FA. Flow cell outflows for each capture probe-to-surface distance were collected into 1 mL Eppendorf tubes for 3 min and weighed. Blanks (no capture probe sampling) were used as a reference for normal flow cell outflow masses.

In the same experiment the concentration of caffeine sampled by capture probe was calculated by measure of caffeine and $d_3$-caffeine by capture probe-MS. Caffeine signal was normalized to the internal standard and transformed into a quantitative concentration using an externally measured calibration curve. Three replicate experiments were conducted for each condition. Given the flow rate through the flow cell is known, extracted flow rates were converted relative to the fraction of flow cell flow rate extracted (FIG. 6) to facilitate comparisons between conditions. FIG. 6 shows that the capture probe-to-surface distance inversely correlates with fluid extraction efficiency, with ~30% of flow cell fluid sampled by the capture probe when position directly over the membrane surface (capture probe-to-surface distance=0 µm). Above 60 µm the liquid microjunction could no longer be reliably maintained.

Figure 7:
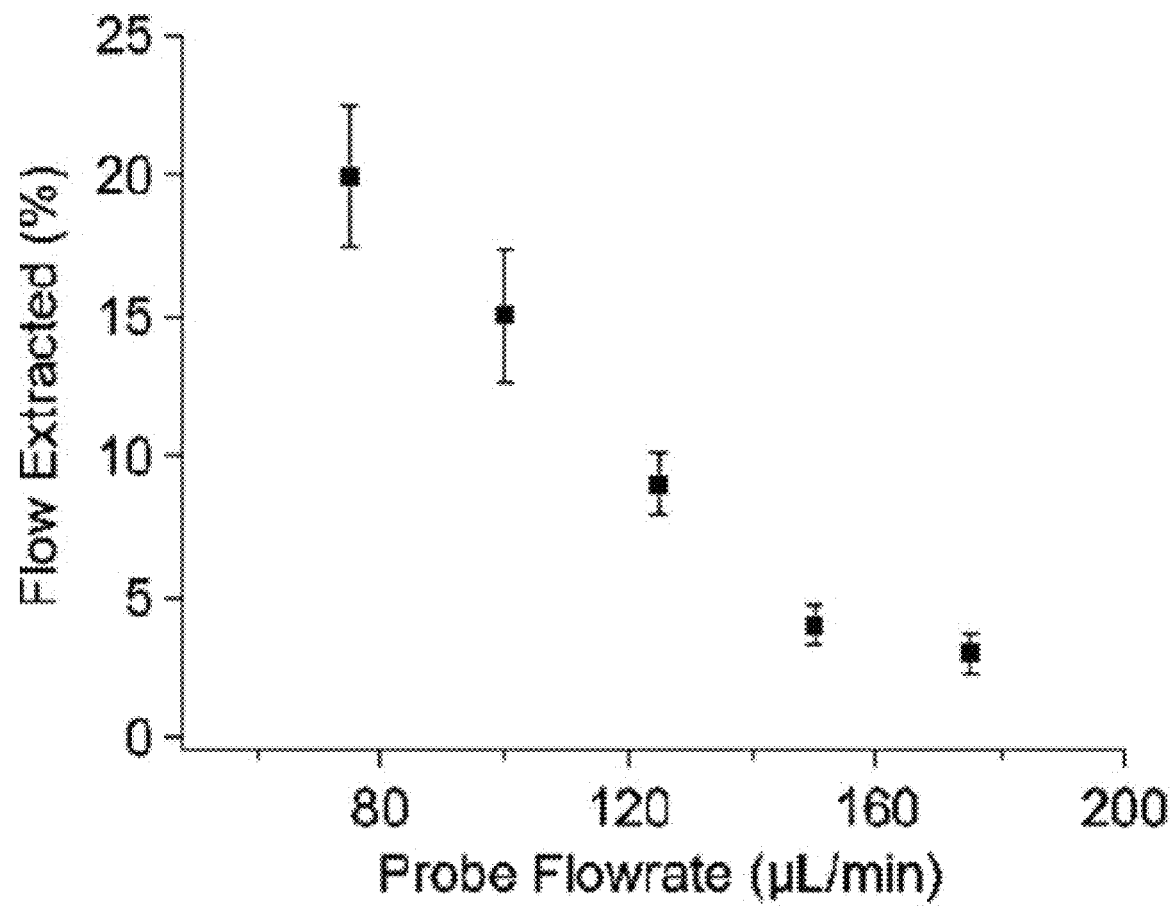
FIG. 7 is a plot of fluid extraction efficiency through the porous membrane (vol %) vs. capture probe flow rate (µL/min) for flow cell flow rate=10 µL/min, capture probe-to-surface distance=20 µm, and membrane pore size=0.4 µm.

Using the MS quantitation methodology outlined for the experiments in FIG. 6, the capture probe flow rate was varied from 75-175 µL/min using 0.29 µM $d_3$-caffeine in 75/25/0.1 (v/v/v) ACN/$H_2O$/FA while keeping the flow cell flow rate, capture probe-to-surface distance and MS ion source aspiration conditions constant. FIG. 7 shows a capture probe flow rate with flow cell flow rate=10 µL/min, capture probe-to-surface distance=20 µm, and membrane pore size=0.4 µm. As the capture probe solvent flow rate increased the fluid extraction efficiency decreased. Above 175 µL/min the capture probe solvent flow rate becomes greater than the self-aspiration rate of the MS ion source, resulting in the capture probe overflowing with solvent and no fluid being extracted from the flow cell. As the capture probe solvent flow rate is lowered below 175 µL/min, there was greater extraction efficiency through the porous membrane. An improvement of liquid extraction by ~10 fold was achieved by decreasing capture probe flow rate from 175 to 75 µL/min (3% to 20%, respectively). Increased extraction efficiency with decreasing capture probe flow rate is explained by considering the effective negative pressure exerted by the capture probe. A flow rate of 151 µL/min was used for the remainder of these experiments.

Fluid extraction efficiency was determined using membrane pore sizes of 0.1, 0.2, 0.4 and 5 µm in diameter (FIG.

Figure 8:
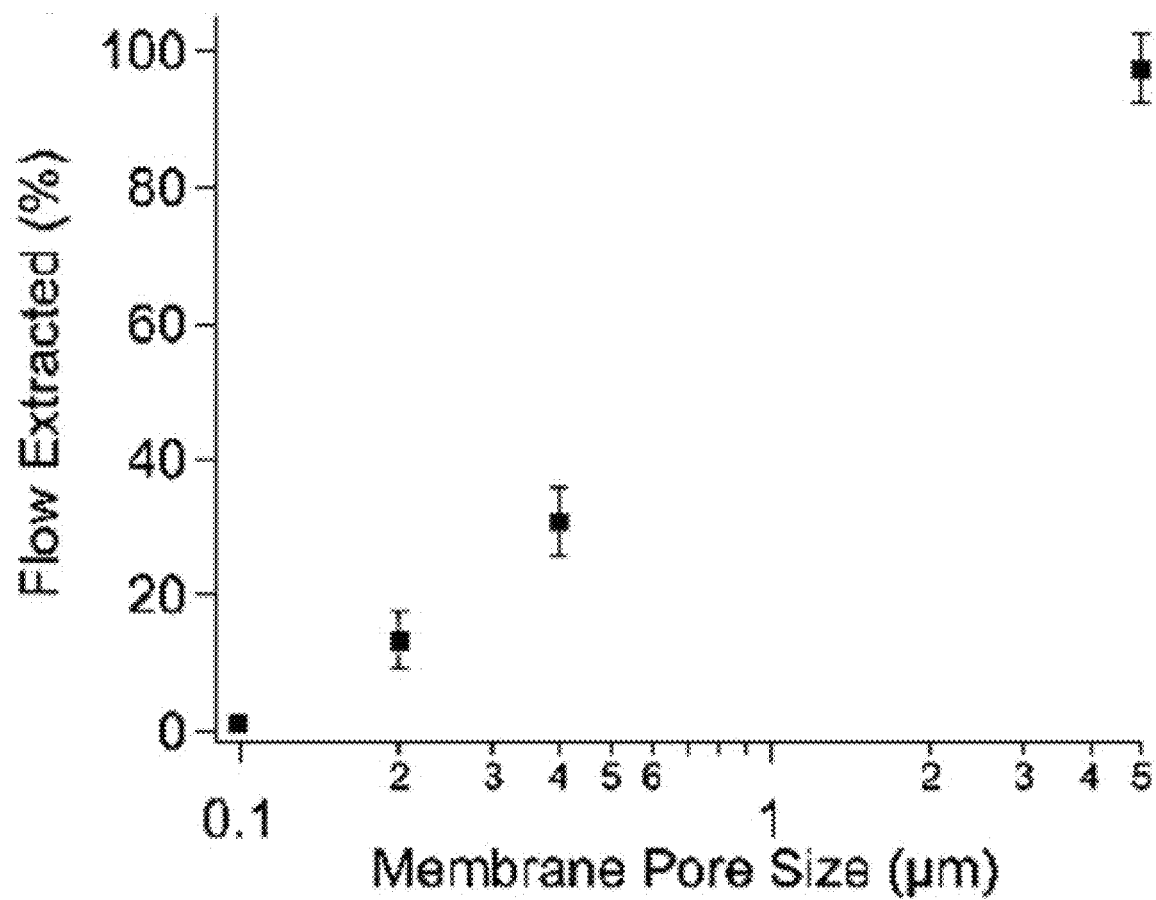
FIG. 8 is a plot of fluid extraction efficiency through the porous membrane (vol %) vs. membrane pore size (µm) for flow cell flow rate=10 µL/min, capture probe flow rate=150 µL/min, and capture probe-to-surface distance=20 µm.

8) while keeping capture probe flow rate, capture probe-to-surface distance and MS ion source aspiration conditions constant. FIG. 8 shows data for flow cell flow rate=10 μL/min, capture probe flow rate=150 μL/min, and capture probe-to-surface distance=20 μm. At 5 μm pore diameter 92% of the flow cell fluid is extracted by the capture probe, while for the 0.1 μm pore size membrane this dropped to 1% (0.1 μL/min). Smaller pore size requires greater vacuum pressure to extract the same amount of liquid through the membrane.

Figure 9:
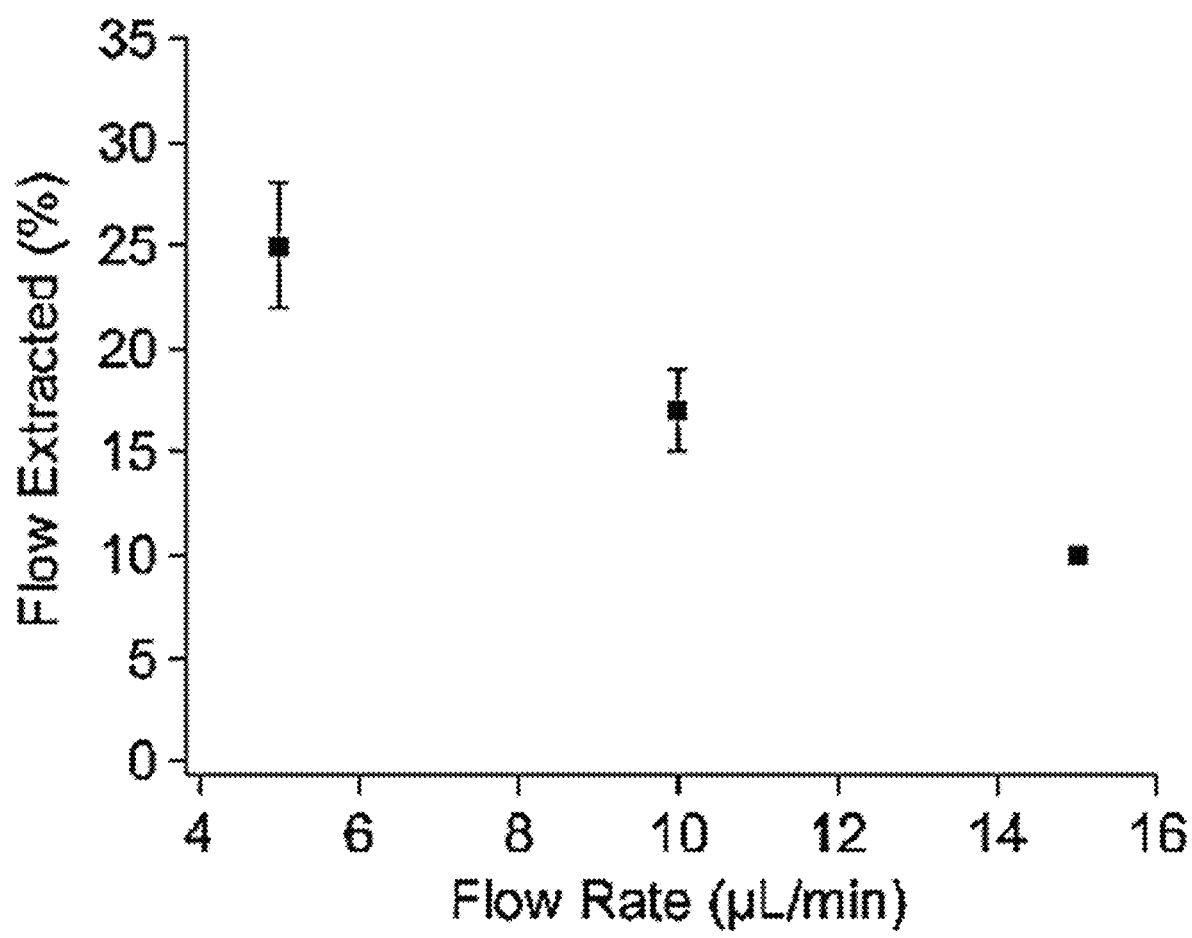
FIG. 9 is a plot of fluid extraction efficiency (vol %) vs. flow cell flow rate (µL/min) for capture probe flow rate=150 µL/min, capture probe-to-surface distance=20 µm, and membrane pore size=0.4 µm.

FIG. 9 shows the extracted flow rate dependence on the fluid flow rate within the flow cell. The increasing flow cell flow rate is inversely related to the amount of extracted flow. Extraction efficiencies were determined by measuring the mass of flow cell outflows and by quantitation of caffeine by capture probe-MS.

Figure 10:
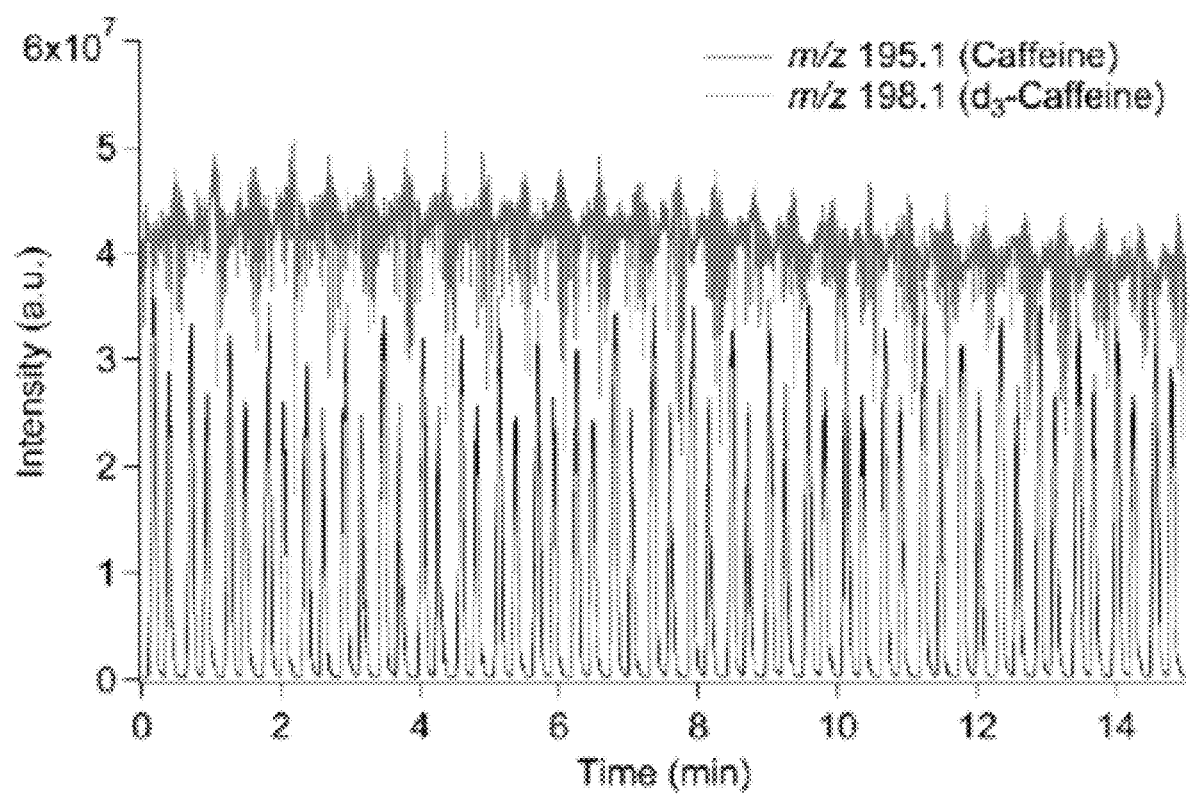
FIG. 10 is an extracted ion chronogram showing intensity (a.u.) vs. time (min) for m/z 195.1 (black) and m/z 198.1 (grey) corresponding to caffeine and $d_3$-caffeine signals.

To demonstrate reproducible and repeated sampling across the porous membrane surface of the channel the capture probe was continuously rastered forward and backward 27 times in 15 min across the same location of the channel at a rate of 0.1 mm/s (FIG. 10). Effectively, these scans demonstrate periodic monitoring of the fluid channel over several minutes. A 2.55 μM caffeine solution was continuously flowed through the flow cell at a rate of 10 μL/min. Transects across the channel result in a Gaussian-like signal profile that remained consistent for all 27 replicate scans.

Figure 11:
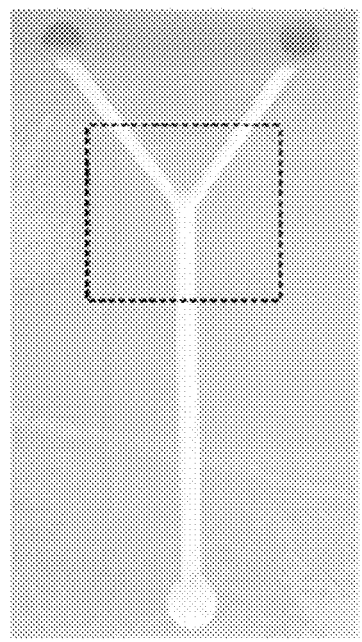
FIG. 11 is an optical image of a microfluidic flow cell with a Y-shaped channel, with the dashes representing the area selected for mass spectrometry imaging.
Figure 12:
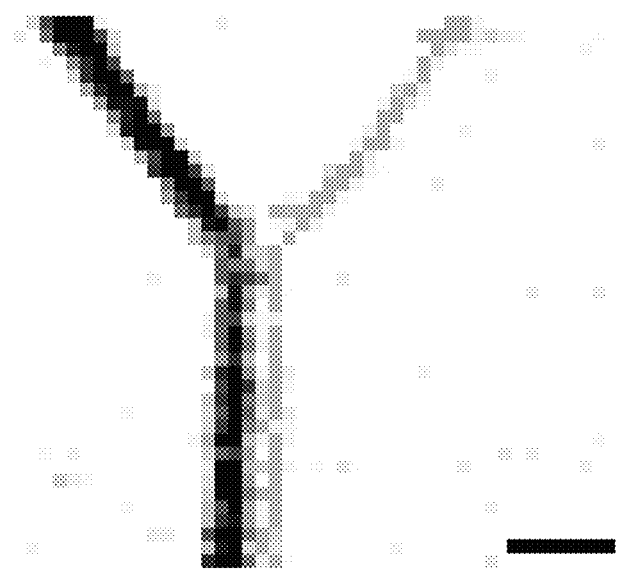
FIG. 12 is an MS image of the dashed area in FIG. 12 showing propranolol (m/z 260.1, light grey) and caffeine (m/z 195.1, grey) in the flow cell. The scale bar represents 2 mm.

The use of a porous membrane enables sampling and chemical imaging of dynamic microfluidic devices. As a proof-of-concept a microfluidic device with a two-input Y-tee channel was fabricated and sealed using a 0.4 μm porous PETE membrane (FIG. 11). FIG. 11 shows optical image of the microfluidic flow cell with a Y-shaped channel. The dashed area was selected for MS imaging in FIG. 12. Input channels were 0.75 mm wide and 0.165 mm deep, and the combined channel was 1 mm wide and 0.165 mm deep. To validate the imaging resolution and accuracy of the chemical imaging capability, input channel #1 was fed with 15 μL/min of 2.55 μM propranolol (a.q.) and input channel #2 was fed with 15 μL/min of 2.55 μM caffeine (a.q.). The two inputs and the central channel were then imaged using the capture probe-MS system (FIG. 12). FIG. 12 shows extracted ion chronograms of m/z 195.1 (black) and m/z 260.1 (light grey) corresponding to caffeine and propora-nolol, respectively. To image the surface the capture probe was rastered across the flow cell at 0.25 mm/s, with 0.25 mm spacing between lanes for 41 lanes. The image comprised a 10×10 mm surface area (41×41 px image). The resulting capture probe MS image aligned well with the flow cell design. Since the membrane surface is relatively flat, a constant capture probe-to-surface distance could be maintained throughout the imaging experiment. As expected with this type of device, the two solutions fed into the individual input channels remain separate even within the central (combined) channel. Since input flow rates are relatively high, the velocity of fluid in the mixed channel is ~3 mm/s (30 μL/min, 1×0.165 mm rectangular channel). Thus, there is very little time in the imaged area for the two components to mix (<2 sec). This is observed clearly in the MS image where the two components can be seen separated in the central channel. These images demonstrate the ability of capture probe to identify chemically heterogenous regions within a dynamic system anywhere along the porous membrane surface. Note, the same device can be imaged repeatedly to monitor for changes over time.

Figure 13A:
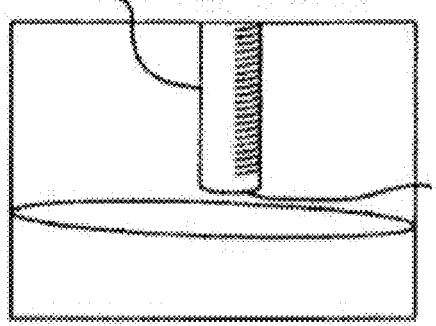
FIG. 13 A-H are schematic depictions of a method of sampling a sample liquid according to an alternative embodiment.
Figure 13B:
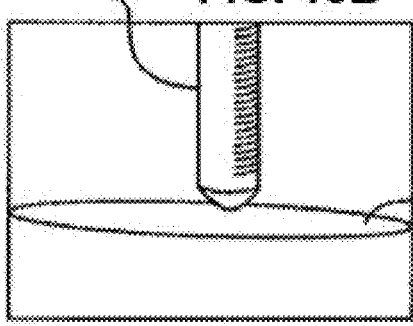
Figure 13C:
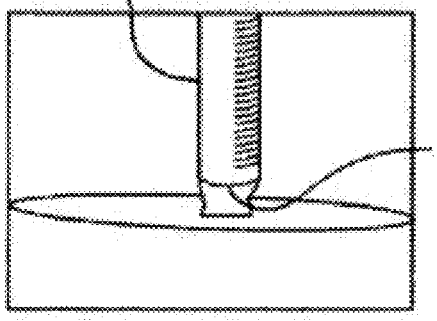
Figure 13D:
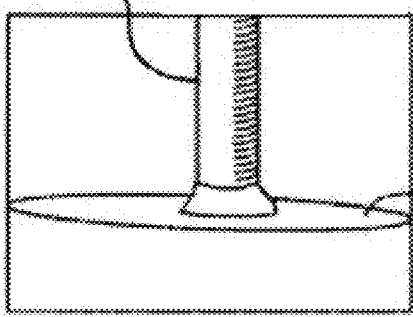
Figure 13E:
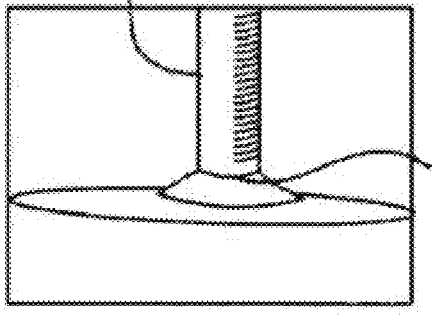
Figure 13F:
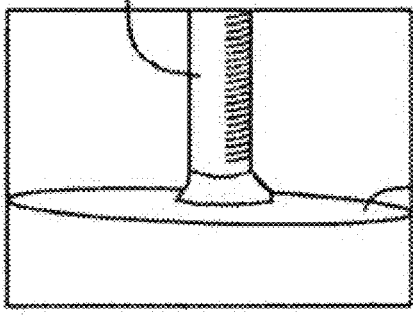
Figure 13G:
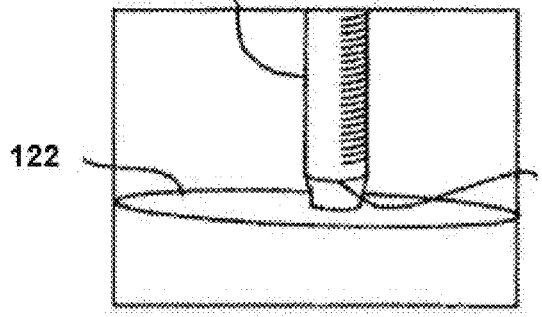
Figure 13H:
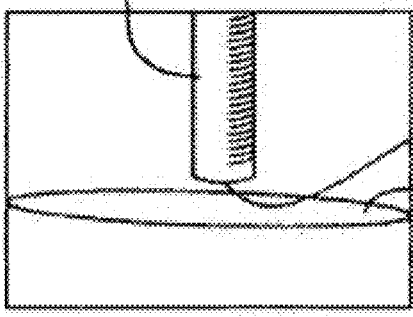

There is shown in FIGS. 13A-13H an embodiment of the invention in which a single conduit 124 serves as one or both of the solvent supply conduit and the solvent/sample exhaust conduit. Positive pressure is applied to solvent within the conduit 124 to cause solvent to be expelled from the open end 126 of the conduit 124 and form a liquid microjunction with the membrane 122. This is followed by subsequent withdrawal of a sample from the surface such as by applying a reduced or negative pressure within the conduit 124. This will create a low pressure within the liquid microjunction that is less than the pressure of the sample liquid on the other side of the membrane 122. For example, in FIG. 13A, the collection probe 124 is positioned above the surface spot to be analyzed. In FIGS. 13B through 13E, the liquid solvent conducted upon the surface begins to build up upon the surface. In FIGS. 13F through 13H, the pressure within the conduit 124 is reduced so that an analyte-rich solution is drawn through the membrane 122, and into the conduit 124 or a separate exhaust conduit.

It can be seen from the view of FIGS. 13B through 13E, the area or spot over which the sample is covered by the liquid solution increases in size (i.e. diameter) as the liquid solution accumulates upon the surface. Such an occurrence can be advantageous in that the solution which is subsequently withdrawn from the surface for analysis contains sample amounts from the relatively broad area covered by the liquid agent.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A method for sampling a sample liquid, comprising the steps of:
    providing the sample liquid through a sample fluid conduit having an internal sample fluid flow channel, the sample fluid conduit comprising a membrane comprising pores, the membrane preventing the passage of the sample liquid through the pores at a first pressure of the sample liquid in the sample fluid flow channel of the sample fluid conduit;
    providing a surface sampling capture probe with a distal end, the capture probe comprising a solvent supply conduit with an open end and a solvent exhaust conduit with an open end;
    flowing solvent composition at the distal end of the capture probe from the open end of the solvent supply conduit to the open end of the exhaust conduit and establishing a liquid junction with the membrane and establishing a second pressure within the liquid junction at the membrane, the second pressure being lower than the first pressure;
    drawing sample liquid from the sample fluid flow channel through the pores of the membrane by the second pressure at the liquid junction wherein the extracted sample liquid is combined with the flowing solvent composition of the capture probe and flows into the open end of the exhaust conduit of the capture probe.

2. The method of claim 1, further comprising the step of conducting mass spectrometry on the extracted sample liquid.

3. The method of claim 1, wherein the surface tension of the solvent composition when in a liquid junction with the membrane having a junction fluid diameter prevents expansion of the junction fluid diameter beyond two times the diameter of the distal end of the capture probe.

4. The method of claim 1, wherein the surface tension of the solvent composition does not permit the solvent to flow through the pores of the membrane at the second pressure.

5. The method of claim 1, further comprising the step of collecting the solvent composition and sample liquid from the exhaust conduit of the capture probe in a storage container.

6. The method of claim 1, wherein the solvent composition comprises a component that is a solvent for an analyte of interest in the sample liquid.

7. The method of claim 1, wherein the solvent composition comprises a solvent liquid and a high surface tension component having a surface tension higher than that of the solvent liquid.

8. The method of claim 1, wherein the solvent composition comprises an acid or base component for ionizing an analyte of interest in the sample fluid.

9. The method of claim 1, wherein the solvent composition comprises a reactant for an analyte of interest in the sample liquid to produce an analyte reaction product which analyte reaction product provides increased sensitivity for mass spectrometry relative to the unreacted analyte of interest.

10. A system for sampling a liquid, comprising:
a sample fluid conduit having an internal sample fluid flow channel, the sample fluid conduit comprising a membrane comprising pores, the membrane preventing the passage of the sample liquid through the pores at a first pressure of the flowing sample liquid in the sample fluid flow channel of the sample fluid conduit;
a surface sampling probe with a distal end, the capture probe comprising a solvent supply conduit with an open end and a solvent exhaust conduit with an open end, wherein a solvent composition flowing at the distal end of the capture probe from the open end of the solvent supply conduit to the open end of the exhaust conduit establishes a liquid junction with the membrane and establishes a second pressure within the liquid junction at the membrane, the second pressure being lower than the first pressure;
wherein sample liquid will be drawn through the pores of the membrane by the second pressure at the liquid junction and the extracted sample liquid will combine with the flowing solvent composition of the capture probe and flow into the open end of the exhaust conduit of the capture probe.

11. The system of claim 10, further comprising a chemical analysis device.

12. The system of claim 11, wherein the chemical analysis device comprises a mass spectrometer.

13. The system of claim 10, wherein the surface tension of the solvent composition when in a liquid junction with the membrane having a junction fluid diameter prevents expansion of the junction fluid diameter beyond two times the diameter of the distal end of the capture probe.

14. The system of claim 10, wherein the solvent supply conduit of the surface sampling probe comprises an outer probe housing, and the solvent exhaust conduit comprises a coaxial inner solvent exhaust conduit, and an annular solvent supply flow passage between at least a portion of the solvent exhaust conduit and at least a portion of the outer probe housing.

15. The system of claim 10, wherein the surface tension of the solvent composition does not permit the solvent composition to flow through the pores of the membrane at the second pressure.

16. The system of claim 10, further comprising a storage container for collecting the solvent composition and sample liquid from the exhaust conduit of the capture probe.

17. The system of claim 10, wherein the solvent composition comprises a component that is a solvent for an analyte of interest in the sample liquid.

18. The system of claim 10, wherein the solvent composition comprises a high surface tension component.

19. The system of claim 10, wherein the solvent composition comprises an acid or base component for ionizing an analyte of interest in the sample fluid.

20. The system of claim 10, wherein the solvent composition comprises a reactant for an analyte of interest in the sample liquid to produce an analyte reaction product which analyte reaction product provides increased sensitivity for mass spectrometry relative to the unreacted analyte of interest.

21. A method for sampling a sample liquid, comprising the steps of:
flowing the sample liquid through a sample fluid flow channel of a sample fluid conduit, the sample fluid conduit comprising a membrane comprising pores, the membrane preventing the passage of the sample liquid through the pores at a first pressure of the sample liquid in the sample fluid flow channel of the sample fluid conduit;
providing a surface sampling capture probe with a distal end, the capture probe comprising a solvent supply conduit with an open end and a solvent exhaust conduit with an open end;
flowing a solvent composition at the distal end of the capture probe from the open end of the solvent supply conduit to the open end of the exhaust conduit and establishing a liquid junction with the membrane and establishing a second pressure within the liquid junction at the membrane, the second pressure being lower than the first pressure;
wherein sample liquid is drawn through the pores of the membrane by the second pressure at the liquid junction and wherein the extracted sample liquid is combined with the flowing solvent composition of the capture probe and flows into the open end of the exhaust conduit of the capture probe;
directing the extracted sample liquid to a chemical analysis device and performing chemical analysis on the extracted sample liquid.

22. The method of claim 21, wherein the chemical analysis device is a mass spectrometer and the chemical analysis is mass spectrometry.

23. The method of claim 21, wherein the surface tension of the solvent composition when in a liquid junction with the membrane having a junction fluid diameter prevents expansion of the junction fluid diameter beyond two times the diameter of the distal end of the capture probe.

24. A method for sampling a sample liquid, comprising the steps of:
flowing the sample liquid in a sample fluid flow channel of a sample fluid conduit, the sample fluid conduit comprising a membrane comprising pores, the membrane preventing the passage of the sample liquid through the pores at a first pressure of the sample liquid in the sample fluid flow channel of the sample fluid conduit;

flowing solvent composition from the open end of a solvent supply conduit to contact the membrane;

establishing a second pressure within the solvent in contact with the membrane, the second pressure being lower than the first pressure;

drawing sample liquid through the pores of the membrane by the pressure differential of the first pressure and the second pressure, wherein the extracted sample liquid is combined with the flowing solvent composition; and, removing the combined extracted sample liquid and solvent composition.

25. The method of claim 24, wherein the combined extracted sample liquid and solvent composition are withdrawn through the solvent supply conduit by varying the pressure within the solvent supply conduit.

26. The method of claim 25, wherein the solvent forms a liquid microjunction between the solvent supply conduit and the membrane.

27. The method of claim 24, wherein the solvent is deposited on the membrane by the solvent supply conduit, then the supply of solvent is stopped and the solvent on the membrane is allowed to stand for a period of time, and then the second pressure is applied to the solvent in contact with the membrane by a solvent exhaust conduit.

* * * * *